Figure 1:
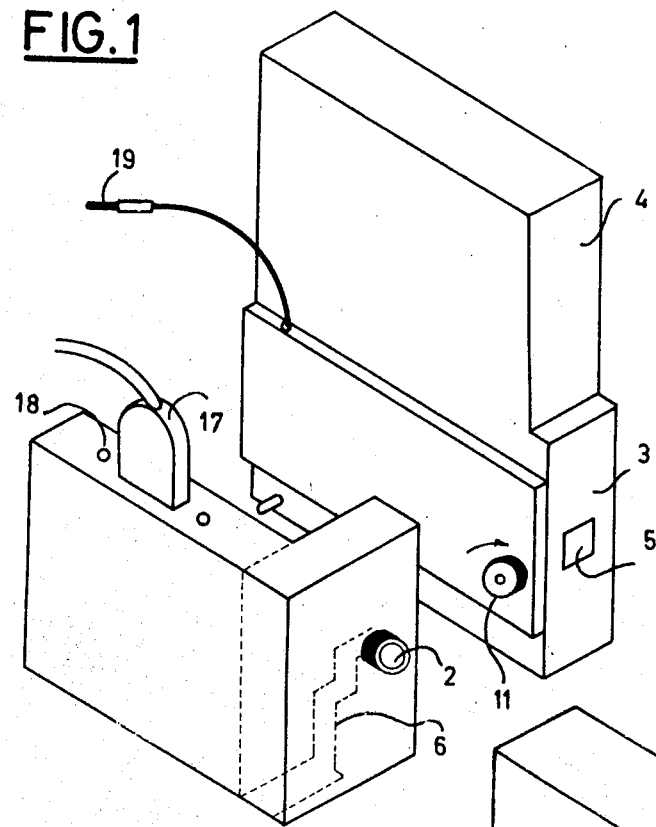

United States Patent [11] 3,534,670

| [72] | Inventor | John E. Holley<br>64, Brightwell Crescent, Tooting, London, S.W. 17, England |
|---|---|---|
| [21] | Appl. No. | 648,522 |
| [22] | Filed | May 26, 1967 |
| [45] | Patented | Oct. 20, 1970 |
| [32] | Priority | May 27, 1966 |
| [33] | | Great Britain |
| [31] | | 23,866/66 |

[54] CAMERAS
5 Claims, 7 Drawing Figs.

[52] U.S. Cl. .................................................... 95/31,
352/78, 352/121, 95/11.5
[51] Int. Cl. ...................................................... G03b 19/04,
G03b 17/46
[50] Field of Search .......................................... 95/31,
31elec, 31ACFS, 19, 53, 55, 11.5; 352/121, 168,
207, 78, 180

[56] References Cited
UNITED STATES PATENTS

| 1,846,571 | 2/1932 | Rochestie et al. | 352/121 |
| 2,400,778 | 5/1946 | Osborne | 95/55 |
| 3,266,862 | 8/1966 | Wagoner | 352/12 |
| 3,362,310 | 1/1968 | Kitai | 95/11.5 |
| 3,402,650 | 9/1968 | Hoadley | 95/31X |
| 3,126,805 | 3/1964 | R. Schröder | 95/31 |

FOREIGN PATENTS

| 1,117,997 | 11/1961 | Germany | 95/31 |

*Primary Examiner*—Norton Ansher
*Assistant Examiner*—David S. Stallard
*Attorney*—Darbo, Robertson and Vandenburgh ABSTRACT: A photographic camera has optics, a shutter, a film drive and a separable casing and film magazine. The film drive comprises an oscillatory electrical solenoid in the casing and having a driving armature, a clutch connected to said armature, a film engaging sprocket in the magazine, and separable plug and socket connection connecting the sprocket and the clutch. The shutter is a one-piece plane shutter movable transversely of the light path and operated by a shutter solenoid. An electrical circuit is provided to operate the solenoid from a shutter switch. A flash lamp operating, snap action switch is operated by an arm rigidly connected to the shutter.

Patented Oct. 20, 1970

3,534,670

Sheet 1 of 3

Inventor:
John Ernest Holley,
By: Darbo, Robertson & Vandenburgh
attys.

CAMERAS

BACKGROUND OF THE INVENTION

This invention relates to cameras designed to take reels of film for photographing, for example, a succession of documents under identical conditions, in which the film feed and camera shutter are power operated, and an electrical control circuit generates a sequence of shutter operation, photograph flash, and film feed.

In conventional cameras of this type, the film feed is by an electric motor mounted within the camera casing, and the film magazine has to be fitted on to the camera so as to apply the drive connection of the film magazine accurately to the motor spindle of the camera.

Misalignment cannot be tolerated, and in order to maintain the close limits required, both casings must be of cast metal, accurately machined.

Although the optical requirements for such cameras are of a low order, the shutters used are of the same expensive type as are provided for highly sophisticated photographic work. These shutters are driven from the camera motor by expensive gear trains.

It is the object of the present invention to provide drive means, shutters, and sequence controls, designed for the level of requirements of the particular type of camera, so as to provide a camera which is economical in price, and well-suited to its purpose.

An important aspect of the invention is the replacement of the motor drive by an electromagnetic oscillatory solenoid pawl-and-ratchet drive, the stroke of which equals the length of a film frame. By permanently mounting one of these compact and economical drives on each film magazine, the need for accurate alignment of camera and magazine disappears, and the casings are made of sheet metal.

Another important aspect of the invention is the use of a plane sheet metal shutter cooperating with a fixed aperture and a simple optical system, the shutter being directly operated in its own plane by a linear electromagnetic solenoid in timed relation to the operation of the feed solenoid under electrical sequence control, which can also relate the operation of a photographic flash in the camera to the opening of the shutter.

Figure 2:
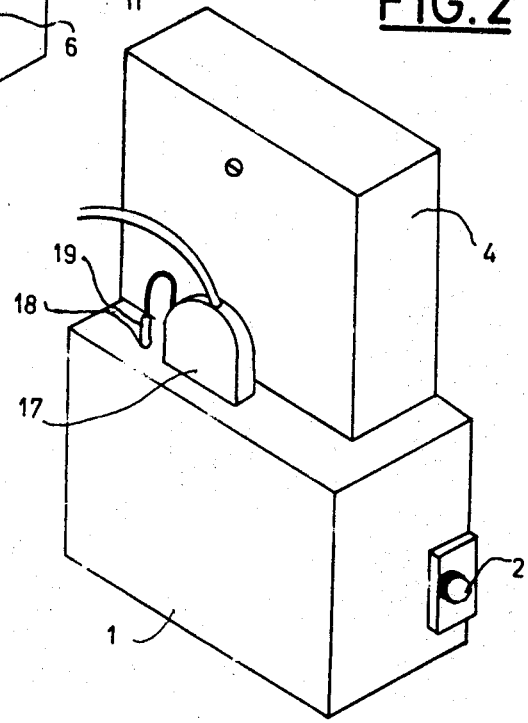
Figure 3:
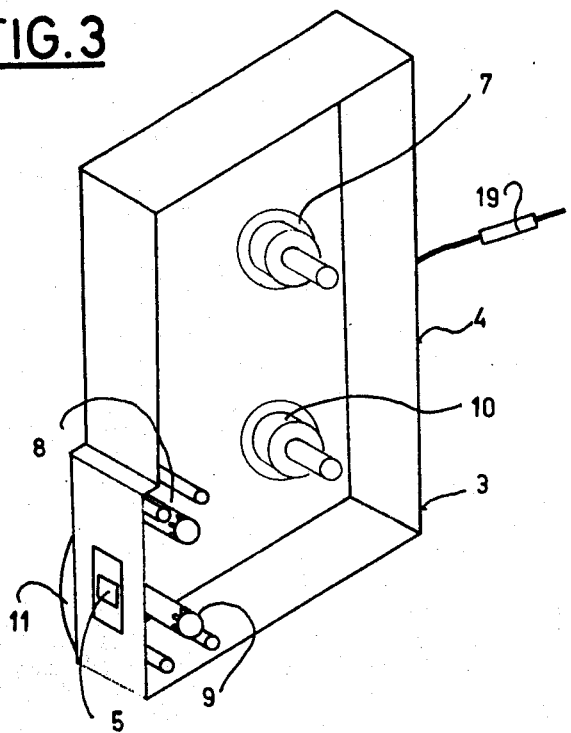
Figure 4:
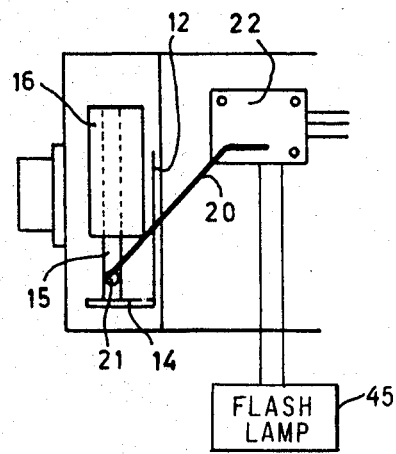
Figure 5:
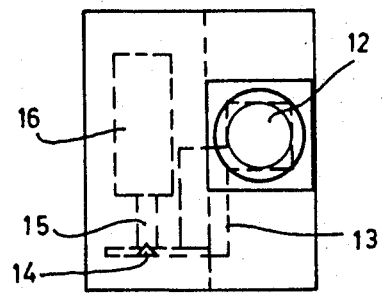
Figure 6:
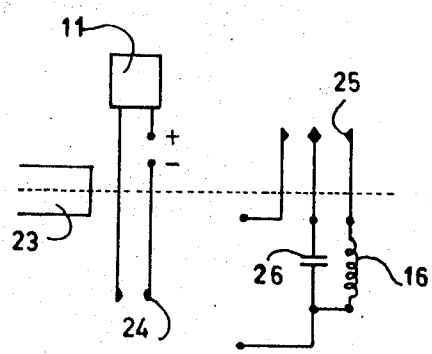
Figure 7:
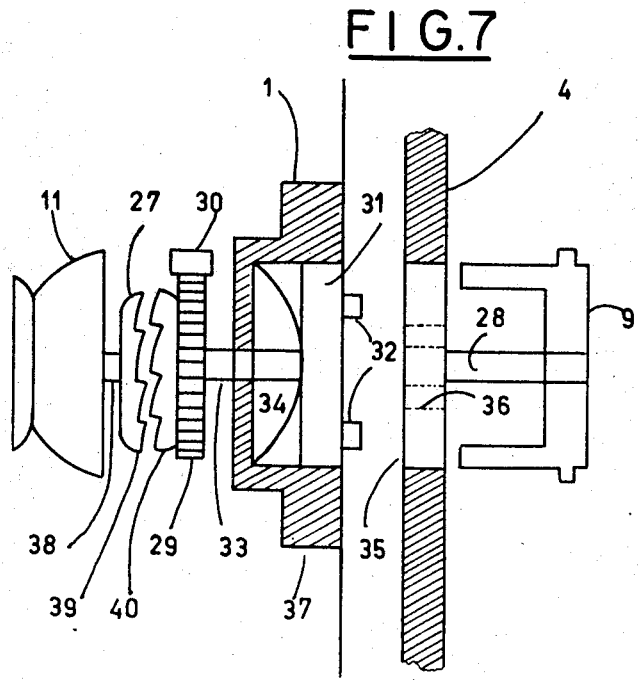

The invention will be described with reference to the accompanying drawings in which:

FIG. 1 is an exploded view of the camera and a film magazine incorporating the invention, FIG. 2 shows the assembled camera and magazine, FIG. 3 shows the drive arrangement for the film magazine, FIGS. 4 and 5 show the shutter operation, FIG. 6 shows the electrical control circuit, and FIG. 7 is an enlarged sectional view of the film drive.

The camera 1 is L-shaped, the eyepiece 2 being in the short leg of the L. The magazine 4 comprises a lower portion 3 formed to fit into the angle of the camera, and contains the release and takeup spools and the film drive.

The magazine portion 3 has a film frame aperture 5 backed by a pressure plate, which is located behind the camera shutter 6 when the magazine is clipped to the camera.

As shown in FIG. 3 the film passes from the release spool on spindle 7 through the guide roller assembly 8; between the aperture 5 and its pressure plate; through the drive sprocket wheel 9 to the spring driven takeup spool on spindle 10. The sprocket 9 is driven by an oscillatory solenoid 11, FIG. 7, in the camera casing. The solenoid used is a Ledex sold by N.S.F. Ltd.

The spindle of the rotary armature of solenoid 11 carries a unidirectional clutch 27, FIG. 7, the driven half of which is removably connected to the spindle 28 of the filmdrive sprocket wheel 9. Each stroke of the solenoid armature rotates the sprocket 9 through an angle sufficient to feed the film by one frame. The armature is spring-returned independently of spindle 28.

As shown in FIGS. 4 and 5 the shutter is a plane metal plate 12 integral with a supporting plate 13 fixed at 14 to the free end of the armature 15 of a linear electromagnetic solenoid 16 mounted in the front end of the main leg of the camera 1. The axis of the solenoid is vertical and the shutter moves up and down in its own vertical plane between the optics and the film.

The camera flash 45 is controlled by a microswitch 22, FIG. 4, operated by a spring arm 20 terminating in a ball or roller 21 mechanically operated by the shutter mechanism.

The electrical power supply is via a plug 17 into a socket in the top of the camera, FIG. 1. Internal connections pass from the socket to a small socket 18 adapted to receive a plug 19 connected to the solenoid 11 of the magazine.

The control circuit comprises an electromagnetic or other form of relay 23, FIG. 6, in the camera, operable by the camera switch (not shown).

The relay has simple make contacts 24 in the circuit connected via plug-and-socket 18, 19 to the oscillatory solenoid 11 of the magazine, and changeover contacts 25, the back contact of which is connected to the shutter solenoid 16, the movable contact to a capacitor 26, and the front contact to one terminal of a 12v. battery, the other terminal of which is connected to the other terminals of solenoid 16 and capacitor 26.

When the camera switch (not shown) is operated, relay 23 is energized, so that the contacts 24 energize the rotary solenoid 11 to step the film to position a new frame opposite the shutter.

At the same time, contacts 25 changeover and charge capacitor 26.

The relay 23 is now released so that the solenoid armature is spring-returned. On release of the relay the capacitor 26 is put into circuit via the back changeover contacts with the shutter solenoid 16.

The solenoid 16 is momentarily operated to raise its armature 15 and with it the shutter 12. At the moment the shutter is opened, the microswitch 22 is actuated by spring arm 20 and fires the flash, immediately following which the shutter closes.

The camera and magazine cases are stamped and formed from sheet metal, and this together with the simple mechanisms and drives makes it possible to produce a thoroughly satisfactory and reliable camera very economically. By precision tooling and suitable operative arrangements, the cameras and the magazines are made so that a mechanical drive from the power source in any camera can be plugged into the film drive in any magazine. Thus, the solenoid 11 and clutch 27 are mounted in the camera casing as shown in FIG. 7, the drive spindle 33 from the clutch 27 carrying a rotary plug (or socket) 31 journaled in a seating 37 in the casing 1. In the opposed part of the magazine 4 is journaled a socket (or plug) 35 connected by spindle 28 to the sprocket 9 of the film drive. Thus when a magazine is offered to the camera, the complementary plug and socket are in opposed relation.

Arrangements are made to cater for the possibility that the plug dogs 32 and the socket bores 36 are not, as indicated in FIG. 7, in alignment. For this purpose, the dogs 32 can be depressed against spring pressure, indicated by the dished spring 34, to allow the opposed faces of the camera and magazine to come into contact even if the plug dogs 32 are out of alignment with the socket bores 36. The spindle 38 of the driving member 39 of clutch 27 is normally retracted within the solenoid 11 when the solenoid is idle so that the two halves of the clutch are separated as shown. When the solenoid begins to rotate, the driving member 39 is urged towards the driven member 40 into clutching engagement therewith. When, therefore, the solenoid is operated after attaching a magazine, the clutch will engage and rotate the spindle 33 and the plug 31, 32; if the dogs are depressed, this rotation will at some stage bring them into alignment with a pair of socket bores 36 into which they will engage under pressure of spring 34. Two or more diametrically opposed pairs of bores may be provided in the socket.

Since it is normal practice to feed through a number of frames of a new film because of possible clouding, this operation will result in automatically engaging the plug and socket before photography starts.

Referring now to FIG. 6, it will be seen that the electrical supplies to the film drive and to the shutter drive are independent of one another, although they can be controlled together. However, it is obvious that the two drives can be independently operated, either by separate manual controls, or from an electrical control circuit arranged to operate the film drive and the shutter drive in any desired sequence.

It will be seen that a ratchet 29 is mounted on the spindle 33 and cooperates with a pawl 30 to locate the shaft precisely at the end of the solenoid stroke and if desired to ensure that the drive is unidirectional. Equally, the clutch and the pawl-and-ratchet can be arranged for forward and reverse drive.

Thus, by the use of manual controls, or of well-known and conventional programming circuits, the camera can be used for sequences including reversals for double exposures, for example.

I claim:

1. In a photographic camera having photographic optics, shutter means, a film drive, and a separable casing and film magazine which magazine has a device for engaging the film, the improvement comprising:

said casing having a right angle extension at one end;

said optics being in said extension of the casing and defining a light path into the camera;

said shutter means being in said extension, said shutter means being a one-piece plane shutter movable transversely of said light path;

a shutter solenoid having an armature and mounted in said casing;

means rigidly connecting said armature and said shutter;

said film drive comprising:

an oscillatory electrical solenoid in said casing;

means in said magazine for engaging the film;

separable driving means having a first portion mounted on said magazine and connected to said means for engaging the film and a second portion mounted on said casing; and clutch means connecting said second portion and said oscillatory solenoid;

an electrical supply connection on said casing; and circuit means connecting said connection and said solenoids for energizing said solenoids.

2. In a camera as set forth in claim 1 for use with a flash lamp, including:

circuit means connected to the lamp and through which the lamp may be energized, said circuit means including a miniature snap-action switch mounted in said casing; and switch operating means for said switch and operably connected thereto, said operating means being rigidly connected to said shutter.

3. In a camera as set forth in claim 1, wherein said clutch means is controllable to transmit forward and reverse drive from said oscillatory solenoid to said means for engaging the film.

4. In a camera as set forth in claim 3, wherein said circuit means comprises independent circuits from said supply connection to said two solenoids for operating the shutter solenoid and the oscillatory solenoid independently.

5. In a camera as set forth in claim 1, wherein said circuit means comprises independent circuits from said supply connection to said two solenoids for operating the shutter solenoid and the oscillatory solenoid independently.